(12) United States Patent
Helms et al.

(10) Patent No.: US 9,989,410 B2
(45) Date of Patent: Jun. 5, 2018

(54) TUNABLE PHOTO-DETECTOR DEVICE

(71) Applicant: Heraeus Noblelight America LLC, Gaithersburg, MD (US)

(72) Inventors: Keith Andrew Helms, Rockville, MD (US); Timothy Allan Dombkowski, Frederick, MD (US); James Robert Elliott, Ellicott City, MD (US)

(73) Assignee: Heraeus Noblelight America LLC, Gaithersburg, MD (US)

( * ) Notice: Subject to any disclaimer, the term of this patent is extended or adjusted under 35 U.S.C. 154(b) by 84 days.

(21) Appl. No.: 14/945,507

(22) Filed: Nov. 19, 2015

(65) Prior Publication Data
US 2016/0146664 A1    May 26, 2016

Related U.S. Application Data

(60) Provisional application No. 62/186,581, filed on Jun. 30, 2015, provisional application No. 62/084,056, filed on Nov. 25, 2014.

(51) Int. Cl.
*G01J 1/42* (2006.01)
*G01J 1/04* (2006.01)
(Continued)

(52) U.S. Cl.
CPC ............ *G01J 1/429* (2013.01); *B05D 3/061* (2013.01); *G01J 1/0271* (2013.01);
(Continued)

(58) Field of Classification Search
CPC ....................................... G01J 1/429
See application file for complete search history.

(56) References Cited

U.S. PATENT DOCUMENTS

2006/0266939 A1    11/2006  Michiyama et al.
2010/0039641 A1*    2/2010  Park .................... G01J 3/02
                                                           356/310
(Continued)

FOREIGN PATENT DOCUMENTS

CN    101915613         12/2011
JP     60053917 A   *   3/1985  ............... A61B 1/05
WO    199835209          8/1998

OTHER PUBLICATIONS

European Search Report for European Patent Application No. 15020236.4, dated Aug. 23, 2016.

*Primary Examiner* — David Porta
*Assistant Examiner* — Jeremy S Valentiner
(74) *Attorney, Agent, or Firm* — Stradley Ronon Stevens & Young, LLP

(57) ABSTRACT

A photo-detector device may include a substrate having a bottom surface. The photo-detector device may further include a photocell secured to the bottom surface of the substrate. The photo-detector device may further include a metallic block having a top portion secured to a bottom surface of the substrate to enclose the photocell, wherein an opening is formed within the metallic block that extends from the top portion of the metallic block to a bottom portion of the metallic block to form an aperture for light to travel through the metallic block to the photocell. The photo-detector device may further include a member insertable into the metallic block to vary an open area of the aperture.

16 Claims, 11 Drawing Sheets

(51) Int. Cl.
*G01J 1/02* (2006.01)
*B05D 3/06* (2006.01)

(52) U.S. Cl.
CPC ........... *G01J 1/0403* (2013.01); *G01J 1/0414* (2013.01); *G01J 1/0448* (2013.01); *G01J 1/0462* (2013.01); *G01J 1/0437* (2013.01)

(56) References Cited

U.S. PATENT DOCUMENTS

| | | | | |
|---|---|---|---|---|
| 2010/0328083 A1* | 12/2010 | Dillon | ............... | B05D 3/067 340/600 |
| 2013/0201350 A1* | 8/2013 | Zou | ............... | G01N 21/8806 348/207.1 |
| 2015/0373808 A1* | 12/2015 | Kuo | ............... | H05B 37/0218 315/158 |

* cited by examiner

TUNABLE PHOTO-DETECTOR DEVICE

CROSS-REFERENCE TO RELATED APPLICATIONS

This application claims the benefit of U.S. provisional patent application No. 62/186,581 filed Jun. 30, 2015 and U.S. provisional patent application No. 62/084,056 filed Nov. 25, 2014, the disclosures of which are incorporated herein by reference in their entirety.

TECHNICAL FIELD

The disclosure relates generally to photo-detector devices, and more particularly, to a tunable photo-detector for use in ultra-violet curing applications.

BACKGROUND

Radiant energy may be used in a variety of manufacturing processes to treat surfaces, films, and coatings applied to a wide range of materials. Specific processes include, but are not limited to, curing (e.g., fixing, polymerization), oxidation, purification, and disinfection. Processes employing radiant energy to polymerize or effect a desired chemical change are rapid and often less expensive compared to a thermal treatment. The application of radiant energy can also be localized to control surface processes and allow preferential curing only where the radiant energy is applied. Curing can also be localized within the coating or thin film to interfacial regions or in the bulk of the coating or thin film. Control of the curing process is achieved through selection of a radiation source type, physical properties (for example, spectral characteristics), spatial and temporal variation of the radiant energy, and curing chemistry (for example, coating composition).

A variety of radiation sources may be used for curing, fixing, polymerization, oxidation, purification, or disinfections applications. Examples of such sources include, but are not limited to, photon, electron, or ion beam sources. Typical photon sources include, but are not limited to, arc lamps, incandescent lamps, electrodeless lamps and a variety of electronic and solid-state sources (i.e., lasers). Conventional arc type ultraviolet (UV) lamp systems and microwave-driven UV lamp systems typically use tubular bulb envelopes made of fused quartz glass or fused silica.

In many instances, current or voltage received from the existing photodetector device, which is a part of the UV curing lamp assembly, is monitored and an error is determined when the amount of current or voltage does not match a pre-determined value or range for a light source in the UV curing lamp assembly. When this error occurs, it normally indicates insufficient light received from the light source within the UV curing lamp assembly. Accordingly, the UV curing lamp assembly is instructed to shut down and an error code is displayed to the user. It is also possible that the photodetector device may not be functioning properly, which may result in the return of an error when there was actually sufficient light from the light source. Users typically need to replace either the light source, the photodetector device, or both, to re-establish operation of the UV curing lamp assembly. Further, users are typically restricted from placing two UV curing lamp assemblies face-to-face, as the light from one light source might satisfy the pre-determined value or range requirement in the other light source, even if the other light source is defective.

SUMMARY

The above-described problems are addressed and a technical solution is achieved in the art by providing a tunable and/or adjustable photo-detector device for use in UV curing lamp applications. In one example, the photo-detector device includes a substrate having a bottom surface. The photo-detector device may further include a photocell secured to the bottom surface of the substrate. The photo-detector device may further include a metallic block having a top portion secured to the bottom surface of the substrate to enclose the photocell, an opening formed within the metallic block that extends from the top portion of the metallic block to a bottom portion of the metallic block to form an aperture for light to travel through the metallic block to the photocell. The photo-detector device may further include a member insertable into the metallic block to vary an open area of the aperture.

In another example, an intelligent ultraviolet curing apparatus includes an irradiator having a light source and the tunable and/or adjustable photo-detector device mounted onto the irradiator.

In another example, a method for operating an intelligent ultraviolet curing apparatus using the tunable and/or adjustable photo-detector device includes providing an irradiator containing a light source and providing a tunable and/or adjustable photo-detector device mounted within the irradiator. The tunable and/or adjustable photo-detector device includes a photocell placed on the bottom surface of a substrate and a metallic block having a top portion secured to a bottom surface of the substrate to enclose the photocell. An opening is formed within the metallic block that extends from the top portion of the metallic block to a bottom portion of the metallic block to form an aperture for light to travel through the metallic block to the photocell. The tunable photo-detector device further includes a member insertable into the metallic block to vary an open area of the aperture. The method also includes monitoring a current or voltage value generated by the photocell of the tunable and/or adjustable photo-detector device. The current or voltage value is based on a light output of the light source. The method further includes comparing the current or voltage value with a predetermined baseline output current or voltage and adjusting a position of the member within the metallic block when the current or voltage value is not substantially equal to a pre-determined baseline output current or voltage.

In another example, the method includes continuously comparing the current or voltage value based on the light output of the light source, and adjusting a position of the member within the metallic block, via closed loop control, to compensate for deterioration in sensing capability of the photocell over time.

In another example, an intelligent ultraviolet curing apparatus includes two irradiators each of which include a light source and a tunable and/or adjustable photo-detector device mounted within each of the two irradiators.

In another example, a method of operating two intelligent ultraviolet curing apparatuses with their light sources facing each other (face-to-face operation) includes establishing a baseline operating condition for each intelligent ultraviolet curing apparatus independently, based on its own light source. The method further includes using the tunable and/or adjustable photo-detector device of each intelligent ultraviolet curing apparatus to compensate for light originating from the other intelligent ultraviolet curing apparatus' light source via continuous monitoring and closed loop control.

BRIEF DESCRIPTION OF THE DRAWINGS

The invention may be more readily understood from the detailed description of an exemplary embodiment presented below considered in conjunction with the attached drawings in which.

It is to be understood that the attached drawings are for purposes of illustrating the concepts of the invention and may not be to scale.

DETAILED DESCRIPTION

Figure 1:
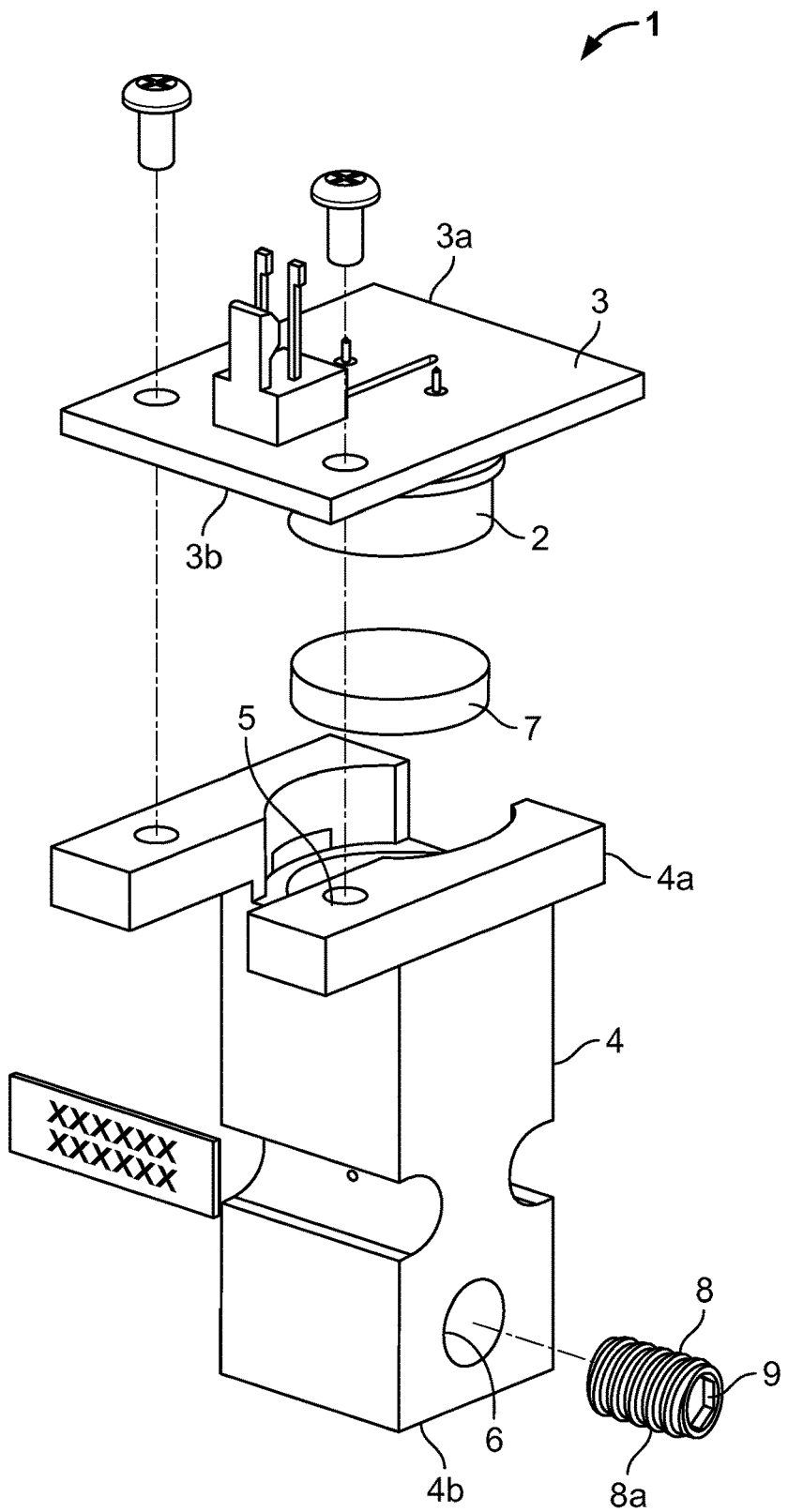
FIG. 1 is a perspective view of a tunable and/or adjustable photo-detector device.

FIG. 1 is a perspective view of a photo-detector device 1 (hereinafter "the device") in accordance with an example of the disclosure. The device 1 may include a photocell 2 coupled to a substrate 3 having a top surface 3a and a bottom surface 3b. As known to one of ordinary skill, a photocell is an electronic device which produces current or voltage when exposed to light or other electromagnetic radiation. Accordingly, the photocell may detect and measure light of various wavelengths. Specifically, the photocell 2 may be securely placed on the bottom surface 3b of the substrate 3. In one example, the substrate 3 may be a circuit board.

The device 1 may include a metallic block 4 having a top portion 4a and a bottom portion 4b. The top portion 4a may be securely coupled to a bottom surface 3b of the substrate 3. An opening 5 may be formed within the metallic block 4 such that the opening 5 may extend from the top portion 4a of the metallic block 4 through to the bottom portion 4b of the metallic block 4. A receptacle 6 may be formed within the bottom portion 4b of metallic block 4. Specifically the receptacle 6 may intersect the opening 5 within the metallic block 4. In one example, the receptacle 6 may be substantially cylindrical. The device 1 may further include a lens 7 securely coupled between the bottom surface 3b of the substrate 3 and the top portion 4a of the metallic block 4. The lens 7 may function to filter the light, specifically ultraviolet (UV) light received by the photocell 2. As shown in FIG. 1, the substrate 3 may be secured to the top portion 4a of the metallic block with two screws.

The device 1 may include a member 8, which may be configured to be insertable into the receptacle 6 of the metallic block 4. The member 8 may have a mating surface 9 and a thread 8a at one end. In one example, the member 8 may be a cylinder with a through hole drilled through its body, transverse to a length of the cylinder. In one example, the member 8 may be a screw with a through hole added to it body, transverse to a length of the screw. This may function similarly to the cylinder with through hole, but permit rotational adjustment instead of linear adjustment. In one example, the member 8 may be a dowel pin, or a solid pin. In one example, the member 8 may be sized and shaped to conform to the receptacle 6 such that the member 8 is easily and securely inserted into the receptacle 6. The diameter of receptacle 6 and corresponding diameter of the member 8 may vary from ~0.1 inch to 0.45 inches. In an example, the member 8 may be cylindrical.

The member 8 may function to rotate within the receptacle 6. In one example, the member 8 may rotate within receptacle 6, intersecting the opening 5 to increasing or decreasing depths, effectively increasing, or decreasing the amount of light that passes through the opening 5 for the detection of light by the photocell 2. Accordingly, the amount of light traveling through the opening 5 to the photocell 2 may be controlled. In one example, the member 8 may rotate to cause the mating surface 9 to align with the opening 5 within the metallic block 4. Accordingly, the member 8 permits light to be detected by the photocell 2. In some examples, the member 8 may rotate to cause the aperture 9 to align with the opening 5 within the metallic block 4. In other examples, the member 8 may rotate to cause the mating surface 9 to partially align with the opening 5 within the metallic block 4. The degree of alignment of the mating surface 9 of the member 8 with the opening 5 of the metallic block may depend on a light source used in the UV curing applications.

In some examples, the member 8 may rotate to cause the mating surface 9 to not align with the opening 5 within the metallic block 4, which may result in closure of the opening 5 at the bottom portion 4b of the metallic block 4. This may occur during the operating of at least two irradiators configured face-to-face, wherein light from one irradiator may satisfy the detection requirements of the photocell of the other irradiator. To address this problem, the amount of light available to be detected by photocell 2 may need to decreased by partially closing off the opening 5. In this way, the amount of light coming from the opposing irradiator is reduced, and the photocell 2 may detect when a bulb in a corresponding irradiator has failed. In addition, there may be instances when all light coming through the opening 5 may be completely closed off, so as to be comparable to the photocell 2's output in "dark" conditions. Accordingly, the member 8 may completely block off light to the photocell 2.

In one example, an initial calibration may be performed on the device 1 to suitably position the member 8 in the receptacle 6 of the metallic block 4 in order to tune the device 1 to a light source (not shown) when the light source is brand new. Specifically, the light source such as a bulb may be fully ignited for the first time, which would cause the bulb to emit maximum light output. In one example, the light output may be ultraviolet (UV) light. The UV light output may be sensed and measured by the photocell 2 in the device 1, which may be translated into current or voltage. This current or voltage may be compared with a predetermined baseline current or voltage. Baseline current or voltage may be determined by measuring a national institute of standards and technology (NIST) traceable "standard bulb." A light output of a known standard bulb may be measured and then associated with the voltage or current output of the photocell when exposed to the light from this bulb under controlled conditions. Controlled conditions may include distance from the bulb surface, temperature, viewing angle, etc.

In one example, the comparison between the currently measured current or voltage may be performed by software associated with a microprocessor that controls the irradiator or a power supply associated with the irradiator. The photocell 2 may have a particular output spectrum depending upon it's performance parameters and the amount of light it is detecting. In order to tune the device 1 to the light source, the measured light output needs to be set to the predetermined baseline output. The microprocessor (not shown in either the irradiator or the power supply) may read the output, interpret it, and compare it to the baseline. Based on the comparison, the microprocessor may send a signal to a motor (not shown) to adjust the member 8 within the receptacle 6. This monitoring of the output may be performed on a continuous basis. In one example, a feedback loop may be established wherein the microprocessor may send a signal to the motor, which may result in the closing off or opening up of the opening 5 by altering the position or depth of member 8. Accordingly, the position of the member 8 within the receptacle 6 may be adjusted to permit more or less light to pass through the opening 5 and arrive at the photocell 2. Specifically, the member 8 may be rotated, preferably by the motor, to move in or out of the receptacle 6 until the mating surface 9 of the member 8 is aligned to a specific amount/degree with the opening 5 in the metallic block 4. In one example, the motor may rotate the member 8 via a worm gear or bevel gear. The specific amount of alignment may be determined when the measured light current or voltage is substantially the equal to the predetermined baseline output current or voltage. Once a specific degree of alignment is achieved, the motor stops, which in turn stops any further rotation of the member 8 and the gear then affixes the member 8 in this alignment position within the receptacle 6.

This specific amount of alignment position of the mating surface 9 of member 8 in the receptacle 6 may be stored in a memory (not shown) and equated to performance parameters in software. Subsequent to the calibration, the member 8 may be an adjusted in the receptacle 6 using the closed loop controls to compensate for changes in performance of the photocell 2, the light source, or the combination of both the photocell 2 and the light source.

In one example, the tuning of the device 1 to the light source may also depend on the type of light source, since different light sources have different light output in different spectral ranges. The sensitivity of the photocell and resulting output of current or voltage when light is sensed will be specific for a certain wavelength range of light. For instance, the photocell may be optimized to sense light in the 350 nanometer to 450 nanometer wavelength range. The spectral output of different bulb types also varies. Some bulbs have significant energy in the 350 to 450 nanometer range, others less. The ability to tune the photodetector device to the output of the bulb allows compensation for varying amounts of energy in the photocell's optimal sensing range. This in turn optimizes the photodetector's ability to detect both good and anamolous bulb output. The ability to discriminate between bulb types based on baseline energy levels in the photocell's optimal sensing range permits changing bulb of types in an irradiator without sacrificing sensitivity and performance. Additionally, mixing of bulb types in a production line containing multiple irradiators may be performed with no loss of sensitivity, as each irradiator's photodetector device may be tuned for optimal performance with the bulb type installed in its irradiator.

Figure 2:
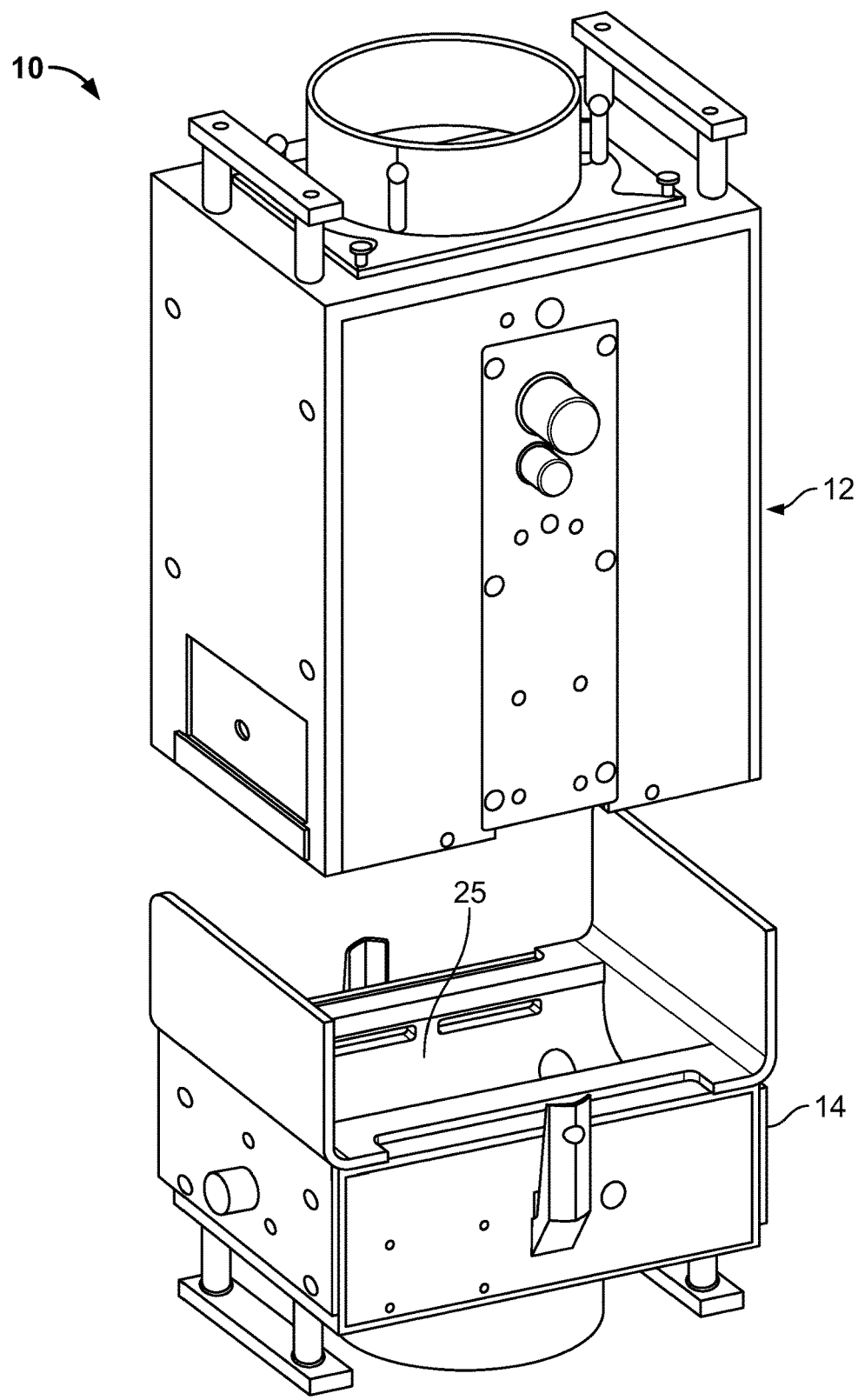
FIG. 2 is a partial cross-sectional view of a lamp assembly.
Figure 3:
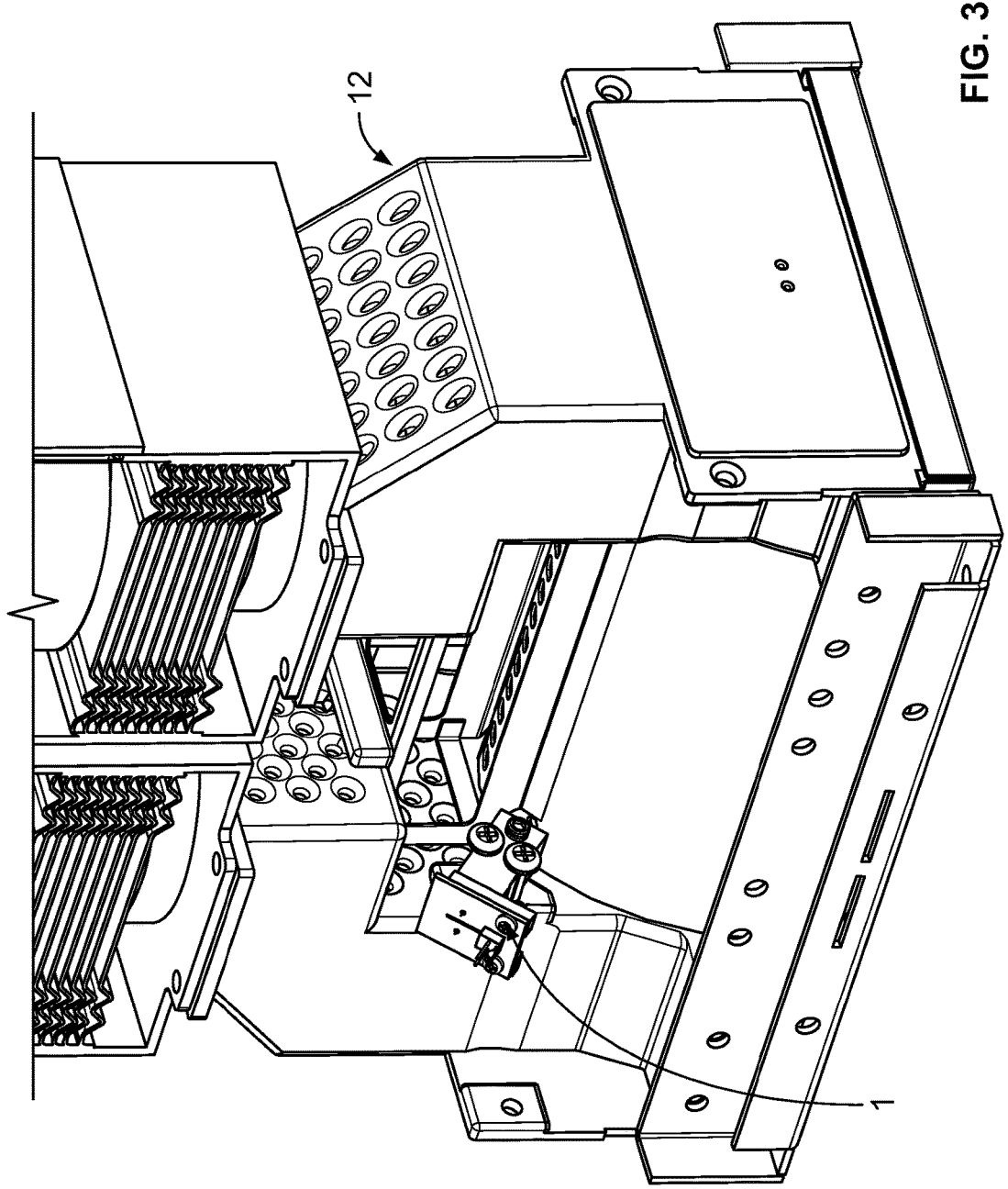
FIG. 3 is a perspective inside view of the irradiator of FIG. 2.
Figure 4:
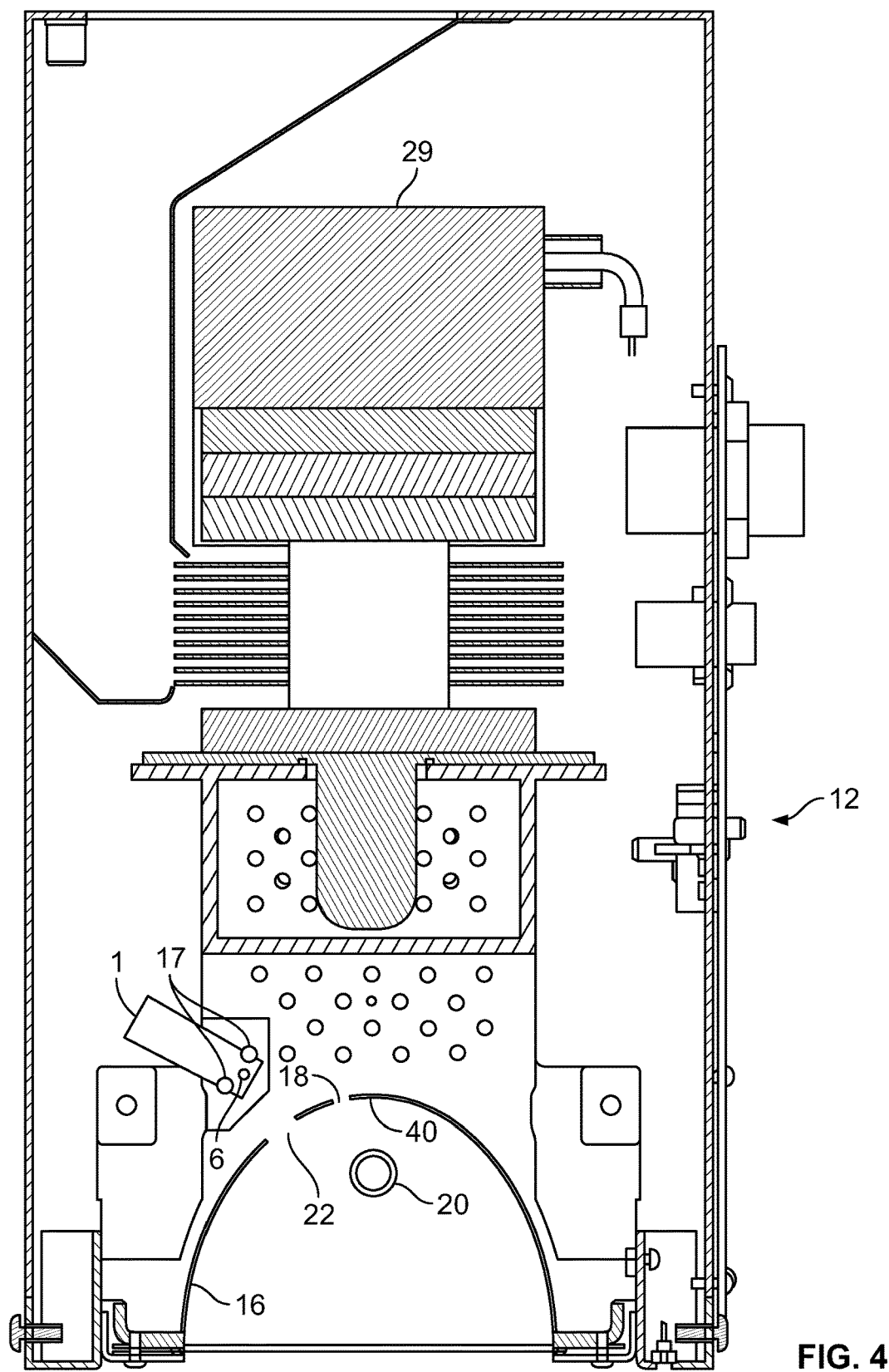
FIG. 4 is a partial cross-sectional internal view of the lamp assembly of FIG. 2, showing a half-elliptical primary reflector, a light source of circular cross-section, and the tunable and/or adjustable photo-detector device.
Figure 5:
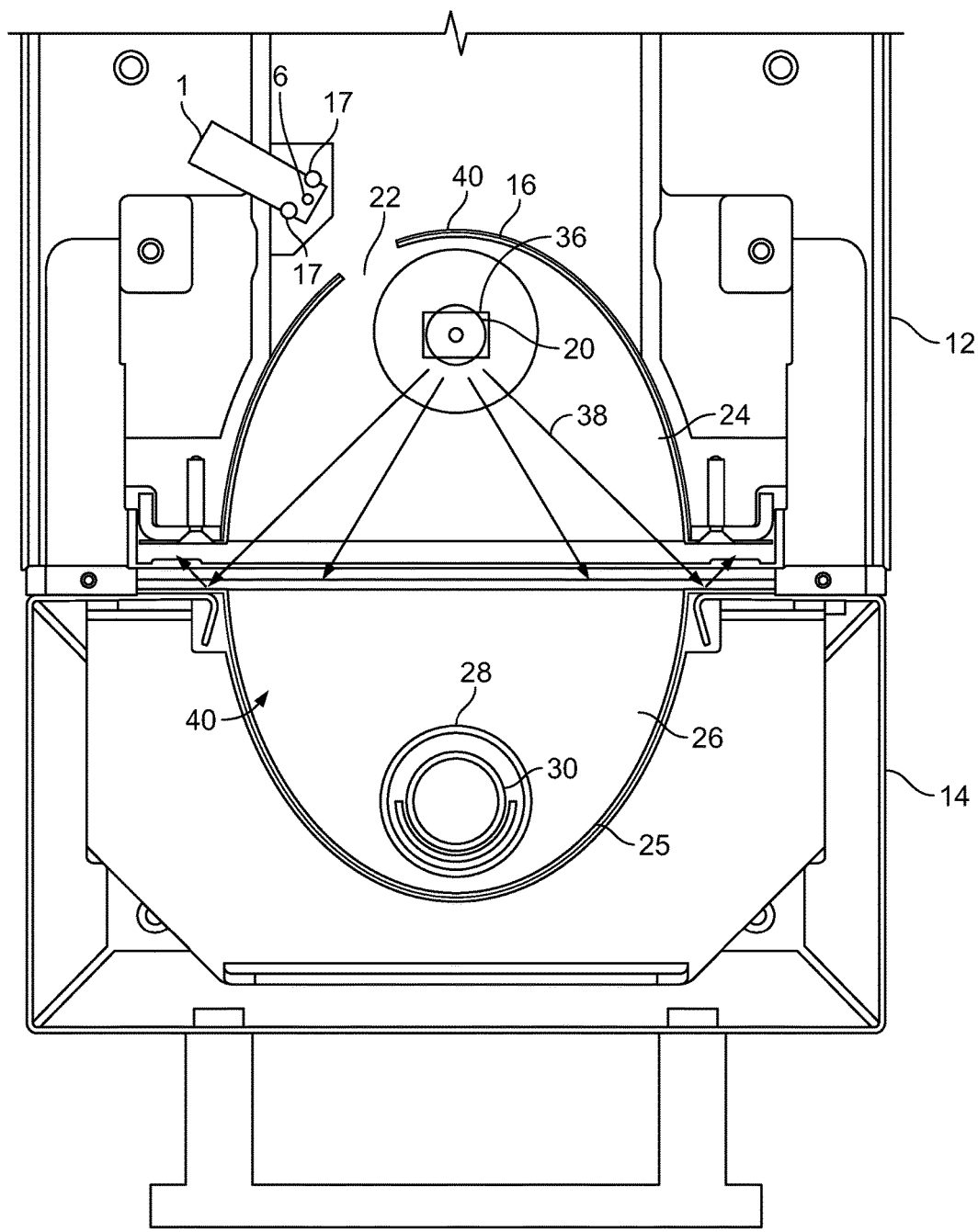
FIG. 5 is a partial cross-sectional internal view of a light shield assembly of FIG. 2 with a light source.
Figure 6A:
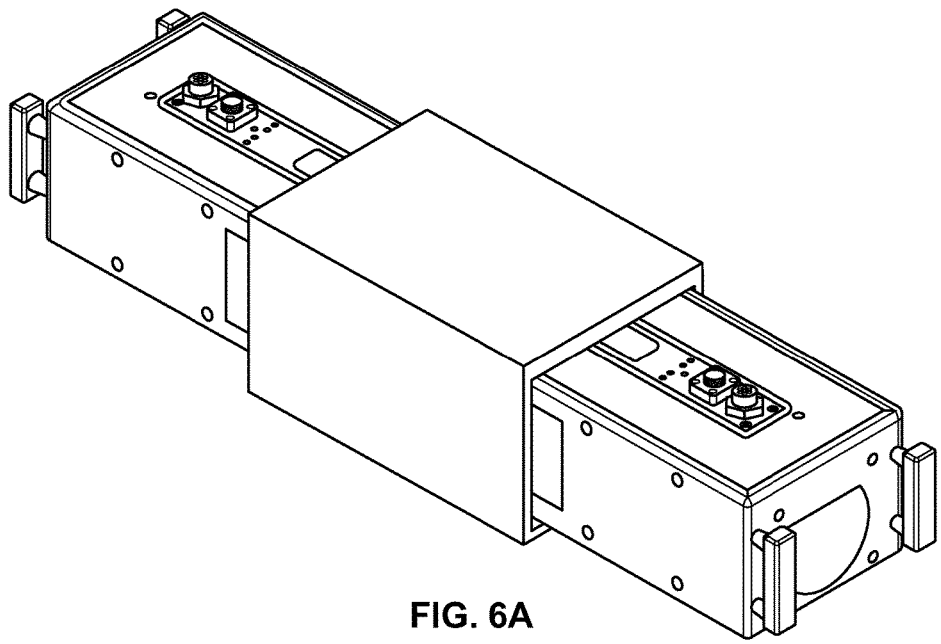
FIGS. 6A-6D are perspective and plan views of a lamp assembly with two irradiators.
Figure 6B:
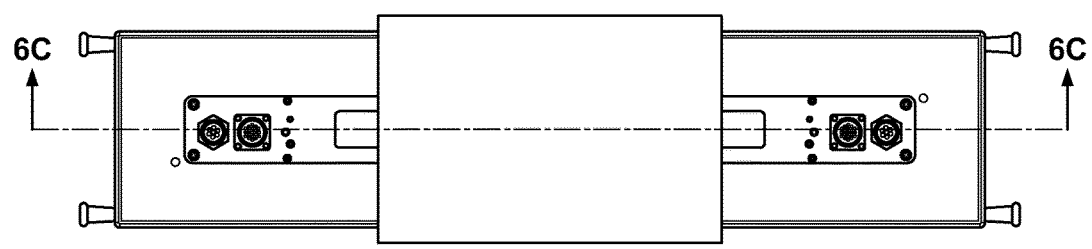
Figure 6C:
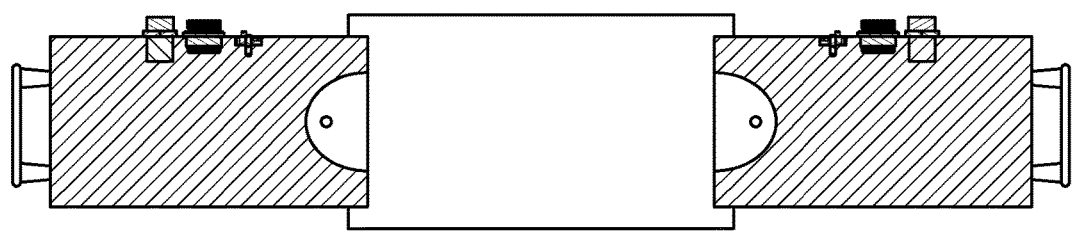
Figure 6D:
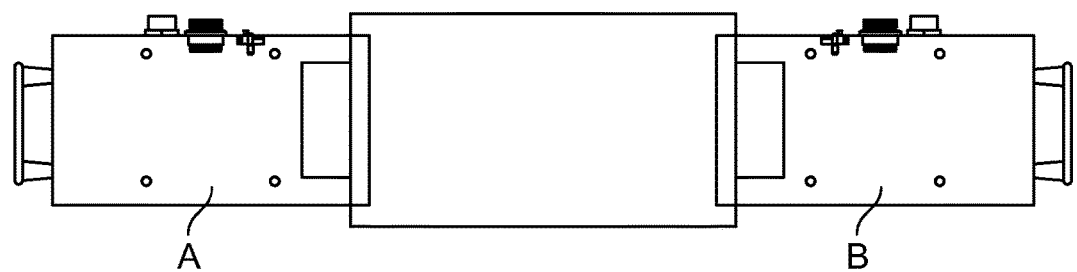

FIG. 2 is a perspective view of a UV curing lamp assembly 10 showing an irradiator 12 and a light shield assembly 14. FIG. 3 is a perspective inside view of the irradiator 12 of FIG. 2. FIG. 4 is a partial cross-sectional view of the UV curing assembly 10 of FIG. 2 showing a half-elliptical primary reflector 16 and a light source 20 of circular cross-section. FIG. 5 is a partial cross-sectional internal view of the light shield assembly 14 of FIG. 2 showing a half-elliptical primary reflector 16 and a light source 20 of circular cross-section mated to a secondary reflector 25 and end reflectors 26.

Referring now to FIGS. 2-5, the apparatus 10 may include the irradiator 12 and the light shield assembly 14. The irradiator 12 may include the primary reflector 16 having a generally smooth half-elliptical shape with a pair of radio frequency (RF) slot openings 18 for receiving microwave radiation to excite a light source 20, and a plurality of openings 22 for receiving air flow to cool the light source 20. The light source 20 may include a lamp (e.g., a modular lamp), such as a microwave-powered lamp having a microwave-powered bulb (e.g., a tubular bulb with a generally circular cross-section) with no electrodes or glass-to-metal seals). The light source 20 may be placed at the internal focus of the half-ellipse formed by the primary reflector 16. The light source 20 and the primary reflector 16 may extend linearly along an axis in a direction moving out of the page (not shown). A pair of end reflectors 24 (one shown) may terminate opposing sides of the primary reflector 16 to form a substantially half-elliptical reflective cylinder. The light shield assembly 14 of FIGS. 2-5 may include a secondary reflector 25 having a substantially smooth elliptical shape. A second pair of end reflectors 26 (one shown) terminates opposing sides of the secondary reflector 25 to form a substantially half-elliptical reflective cylinder.

A work piece tube 30 of circular cross-section may be received in circular openings 28 in the end reflectors 26. The center of the openings 28 and the axis of the work piece tube 30 may be located at the external focus of the half-ellipse formed by the primary reflector 16 (i.e., the foci of the half-ellipse formed by the secondary reflector 25). The work piece tube 30 and the secondary reflector 25 may extend linearly along an axis in a direction moving out of the page (not shown). A reflector cavity 40 may be formed by the primary reflector 16, the secondary reflector 25, and the end reflectors 24, 26.

As shown in FIG. 4, two drill and mounting holes 17 may be formed within the irradiator 12 for mounting the device 1 of FIG. 1 on the irradiator 12 such that only the bottom portion 4b of the metallic block 4 of the device 1 faces the reflector cavity 40. Specifically, the bottom portion 4b of the metallic block 4 with the opening 5 of the device 1 may be positioned with the mounting holes 17 such that opening 5 may permit light to pass from the light source 20, through the hole 22 or slot 18, to the photocell 2. The rest of the metallic block 4 including the receptacle 6 having the member 8, the lens 7, the substrate 3, and the photocell 2 may be positioned further away from light source 20. In one example, the device 1 may view an output of the light source 20 through one of the RF slot opening 18 or the opening 22.

In operation, gas in the light source 20 is excited to a plasma state by a source of radio frequency (RF) radiation, such as a magnetron 29 located in the irradiator 12. The atoms of the excited gas in the light source 20 return to a lower energy state, thereby emitting ultraviolet light (UV). UV light rays 38 radiate from the light source 20 in all directions, striking the inner surfaces of the primary reflector 16, the secondary reflector 25, and the end reflectors 24, 26. Most of the UV light rays 38 are reflected toward the central axis of the work piece tube 30. The light source 20 and reflector design may be optimized to produce the maximum peak light intensity (lamp irradiance) at a surface of a work product (also propagating linearly out of the page) placed inside the work piece tube 30.

In one example, in operation, the UV light rays 38 may be sensed and measured by the photocell 2 in the device 1, which transduces the UV light rays 38 into a current or a voltage. This current or voltage may be monitored and compared with a predetermined baseline output current or voltage. As previously noted, the current or voltage values may be read by a microprocessor (not shown), which may interpret the values and compare them to the predetermined baseline output current or voltage. Based on the comparison, the microprocessor may transmit a signal to the motor to adjust the member 8 within the receptacle 6. This monitoring may be performed on a continous basis. In one example, there may exist a feedback loop (such as a closed loop feedback control in either the irradiator or power supply control systems), wherein after the comparison, the microprocessor may send a signal to the motor, which in turn may close or open the opening 5 by altering the position or depth of the member 8.

In one example, the value of the current or voltage may be more than the value of the predetermined baseline output current or voltage. Accordingly, the current or voltage may be more than needed by the light source 20 or UV curing of the workpiece tube 30. Accordingly, the position of the member 8 within the receptacle 6 may be adjusted to tune the device 1 to the light source 20. As noted, the microprocessor may transmit a signal to the motor (not shown) to adjust the member 8 within the receptacle 6. Specifically, the member 8 may be rotated, preferably by the motor, to move the member 8 in or out of the receptacle 6 until the mating surface 9 of the member 8 is aligned to a specific amount/degree with the opening 5 in the metallic block 4. As noted, the motor may rotate the member 8, preferably using a worm gear or bevel gear. In addition, the specific degree of alignment may be determined when the measured light current or voltage is substantially equal to the predetermined baseline output current or voltage. Further, when this specific degree of alignment is achieved, the motor stops, which in turn stops any further rotation of the member 8 and the gear then affixes the member 8 in this alignment position within the receptacle 6.

In another example, the value of the current or voltage may be less than the value of the predetermined baseline output current or voltage. Accordingly, there may be insufficient current or voltage to generate sufficient UV light rays 38 by the light source 20 for UV curing of the work piece tube 30. Accordingly, the position of the member 8 within the receptacle 6 may be adjusted to tune the device 1 to the light source 20. As noted, the microprocessor may transmit a signal to the motor (not shown) to adjust the member 8 within the receptacle. Specifically, the member 8 may be rotated, preferably by the motor, to move the member 8 in or out of the receptacle 6 until the mating surface 9 of the member 8 is aligned to a specific amount/degree with the opening 5 in the metallic block 4. As noted, the motor may rotate the member 8 using a worm gear or bevel gear. In addition, as noted, the specific degree of alignment may be determined when the measured light current or voltage is substantially equal to the predetermined baseline output current or voltage. Further, when this specific degree of alignment is achieved, the motor stops, which in turn stops any further rotation of the member 8 and the gear then affixes the member 8 in this alignment position within the receptacle 6.

FIG. 6A-6D are perspective and plan views of a UV curing lamp assembly showing two irradiators. In one example, it may be desirable to lower the amount of light available passing through the opening 5 to arrive at the photocell 2, so that the irradiators may be placed face-to-face or to an angle where the light emitted from one irradiator may be sensed by the other irradiator's photocell. If the photocell installed in irradiator A can sense the light output of irradiator B because they are facing each other (at some angle up to face-to-face), then if the bulb in irradiator A fails, the photocell in irradiator A will not be able to discern that bulb A is no longer emitting light, because it will sense the light from irradiator B and "believe" that bulb A is still operational. To overcome this problem, the baseline of the bulb output in irradiator A is read with irradiator B turned off. Utilizing the microcontroller, feedback loop, and motor, the member 8 may be positioned in the opening 5 such that the amount of available light is reduced by 50%. The same operation may be performed on irradiator B with irradiator A turned off. When both irradiators are turned on, each photocell will receive 100% light and be able to discriminate when the light drops to 50% if one of the bulbs burns out or no longer functions.

Figure 7:
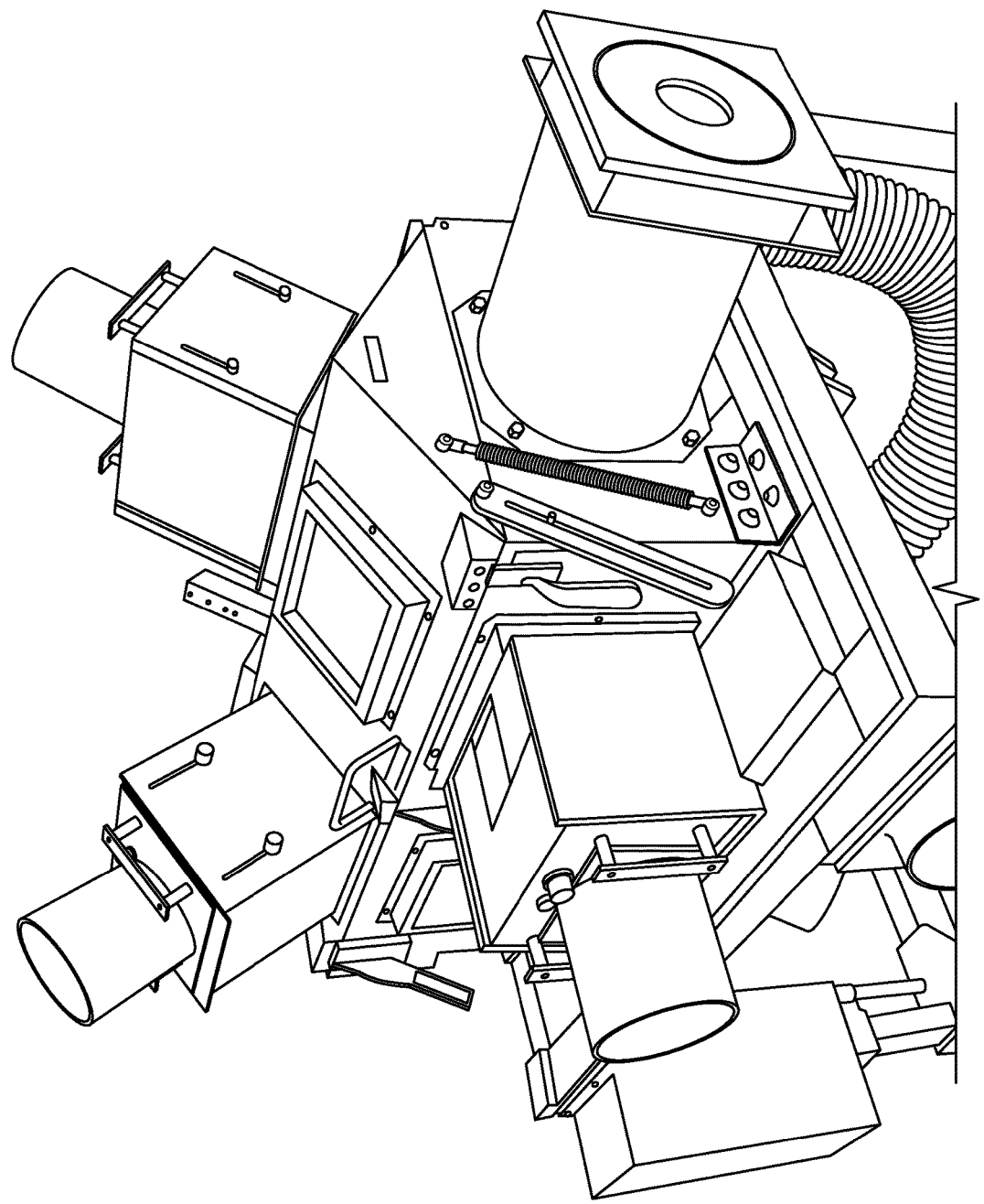
FIG. 7 is a perspective view of a UV curing lamp assembly showing multiple irradiators.

FIG. 7 is a perspective view of a UV curing lamp assembly showing multiple irradiators. A center circular pipe housing is shown with a large gasket in an end. Further away from this end is the light shield housing with openings where irradiators maybe mounted. FIG. 7 shows three irradiators mounted, but, in one example, the machine has the capability to have a total of eight mounted. Also, as shown in FIG. 7, no two irradiators are mounted directly opposite each other, although it would be possible to have the lower two mounted so as to be directly facing their counterparts on the opposite side. In this design, the work piece tube 30 (as shown in FIG. 5) may be inserted into the gasket and pushed down the entire length of the machine through a similar gasket on the other end. The work piece tube 30 may be held in place by the gaskets. Typically, the work piece tube 30 may be placed at the center axis of the light shield, so that all irradiator faces are the same distance away from the work piece tube 30. The item to be cured, in this case a smaller diameter pipe, may be fed down the center of work piece tube, traveling through the work piece tube in front of the face of the irradiators and out of the other end as a cured work piece.

Figure 8:
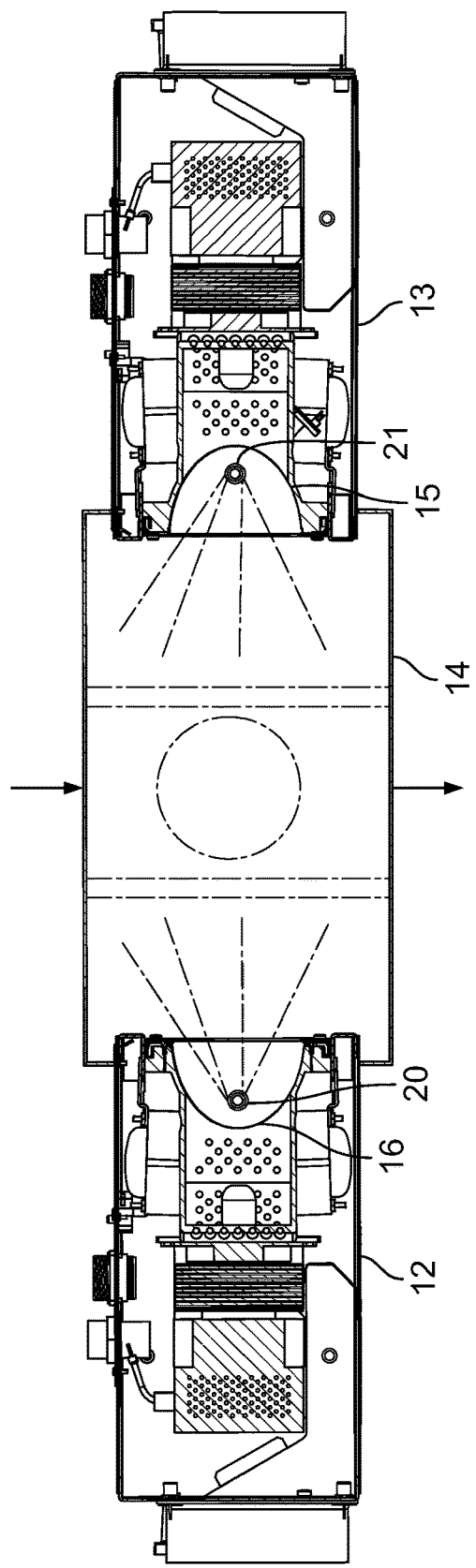
FIG. 8 is a partial cross-sectional view of the lamp assembly showing two irradiators and in a light shield assembly.

FIG. 8 is a partial cross-sectional view of the lamp assembly showing two irradiators 12 and 13 in a light shield assembly 14. The irradiator 13 functions similarly to the irradiator 12 and may include the same components as the irradiator 12. Specifically, the irradiator 12 may include a primary reflector 15 having a generally smooth half-elliptical shape with a pair of RF slot openings 19 for receiving microwave radiation to excite a light source 21, and a plurality of openings 22 for receiving air flow to cool the light source 21. In one example, the light source 21 may be the same as the light source 20 in the irradiator 12. The light source 21 may include a lamp (e.g., a modular lamp, such as a microwave-powered lamp having a microwave-powered bulb (e.g., a tubular bulb with a generally circular cross-section) with no electrodes or glass-to-metal). In another example, the light source 21 may differ from the light source 20 in the irradiator 12 such that the light source 21 may contain materials/plasma that may have a different spectral output than the light source 20. For example, the light source 20 may be an H bulb, manufactured by Heraeus Noblelight America LLC, and the light source 21 may be a D bulb, manufactured by Heraeus Noblelight America LLC. Accordingly, each of the light sources 20 and 21 may have different light output in the range of sensing of the device 1. In one example, any light source facing irradiator 12 that transmits light rays that may be detected by the photodetector 1 may potentially create a situation in which the device 1 may need to be tuned to discriminate between the two light sources 20, 21. The light source 21 may be placed at the internal focus of the half-ellipse formed by the primary reflector 15. The light source 21 and the primary reflector 15 may extend linearly along an axis in a direction moving out of the page (not shown). A pair of end reflectors 25 (one shown) may terminate opposing sides of the primary reflector 15 to form a substantially half-elliptical reflective cylinder. The light shield assembly 14 of FIGS. 6-8 may include a secondary reflector 25 having a substantially smooth elliptical shape. A second pair of end reflectors 26 (one shown) may terminate opposing sides of the secondary reflector 25 to form a substantially half-elliptical reflective cylinder.

Two drilled and tapped holes 17 (as shown in FIG. 4) may be formed within each of the irradiators 12 and 13 for mounting the device 1 of FIG. 1 onto each of the irradiators 12 and 13 such that only the bottom portion 4b of the metallic block 4 of the device 1 faces the reflector cavity 40. Specifically, the bottom portion 4b of the metallic block 4 with the opening 5 of the device 1 may be positioned via the mounting holes 17, such that opening 5 may permit light to pass from the sources 20 and 21. The rest of the metallic block 4 including the receptacle 6 having the member 8, the lens 7, the substrate 3 and the photocell 2 may be positioned further away from the light sources 20 and 21. In one example, the device 1 may view an output of the light source 20 in the irradiator 12 through one of the RF slot opening 18 or the opening 22 in the irradiator 12 and may view an output of the light source 21 in the irradiator 13.

In one example, an initial calibration may be performed on the device 1 in irradiator 12 to suitably position the member 8 in the receptacle 6 of the metallic block 4 in order to tune the device 1 to the light source (not shown) when the light source is brand new. Specifically, the light source 20, such as a bulb, is fully ignited for the first time, which would cause the bulb to emit maximum light output. In one example, the light output is UV rays. The light output 38 may be sensed and measured by the photocell 2 in the device 1, which transduces the light output 38 into a current or a voltage. This current or voltage may be compared with a predetermined baseline output current or voltage. The baseline output current or voltage would be determined by measuring a national institute of standards and technology (NIST) traceable "standard bulb." A light output of a known standard bulb is measured and then associated with the voltage or current output or voltage of the photocell when exposed to the light from this bulb under controlled conditions. Controlled conditions may include distance from the bulb surface, temperature, viewing angle, etc. In one example, the comparison between the current or voltage and measured current or voltage may be conducted by executing software in a microporocessor located in the irradiator or the power supply. The photocell 2 may have a particular output depending upon its performance parameters and the amount of light it is detecting. In order to tune the device 1 to the light source, the measured light output needs to be set to the predetermined baseline output. A microprocessor (not shown in either the irradiator or the power supply) may read the output, interpret it, and compare it to the baseline. Based on the comparison, the microprocessor may transmit a signal to the motor (not shown) to adjust the member 8 within the receptacle 6. This monitoring of the output may be performed on a continuous basis. In one example, there maybe a feedback loop wherein the microprocessor may transmit a signal to the motor, which in turn may close or open the opening 5 by altering the position or depth of member 8. As such, the position of the member 8 within the receptacle 6 may be adjusted to permit more or less light to pass through the opening 5 and arrive at the photocell 2. Specifically, the member 8 may be rotated, preferably by the motor, to move in or out of the receptacle 6 until the mating surface 9 of the member 8 is aligned to a specific level/degree with the opening 5 in the metallic block 4. In one example, the motor may rotate the member 8 using a worm gear or a bevel gear. The specific level of alignment may be determined when the measured light current or voltage is substantially the same as, or substantially equal to, the predetermined baseline output current or voltage. Once this specific level of alignment is achieved, the motor stops, which in turn stops any further rotation of the member 8 and the gear then affixes the member 8 in this alignment position within the receptacle 6.

Accordingly, this specific level of alignment position of the mating surface 9 of member 8 in the receptacle 6 may be stored in a memory (not shown) and equated to performance parameters in software. Subsequent to the calibration, the member 8 may be adjusted in the receptacle 6 using the closed loop controls and compensated for changes in performance of the photocell 2, the light source 21, or the combination of both the photocell 2 and the light source 21. In one example, the tuning of the device 1 to the light source 21 also depends upon the type of light source 21.

In another example, an initial calibration is performed on the device 1 in the irradiator 13 to suitably position the member 8 in the receptacle 6 of the metallic block 4 in order to tune the device 1 to the light source 21 when the light source 21 is brand new. The initial calibration performed on the device 1 in the irradiator 13 may be the same as the initial calibration performed on the device 1 in the irradiator 12.

As noted, in operation, gas in the light source 21 is excited to a plasma state by a source of radio frequency (RF) radiation, such as a magnetron 29 located in the irradiator 12. The atoms of the excited gas in the light source 20 return to a lower energy state, thereby emitting ultraviolet light (UV). UV light rays 38 radiate from the light source 20 in all directions, striking the inner surfaces of the primary reflector 16, the secondary reflector 25, and the end reflectors 24, 26. Most of the UV light rays 38 are reflected toward the central axis of the work piece tube 30. The light source 21 and reflector design may be optimized to produce the maximum peak light intensity (lamp irradiance) at a surface of a work product (also propagating linearly out of the page) placed inside the work piece tube 30. In one example, in operation, the UV light rays 38 may be sensed and measured by the photocell 2 in the device 1 in the irradiator 12, which transduces the UV light rays 38 into a current or a voltage. Similarly, in operation, the UV light rays 38 may also be sensed and measured by the photocell 2 in the device 1 in the irradiator 13, which transduces the UV light rays 38 into a current or a voltage.

Similar to the above operation, gas in light source 21 is also excited to a plasma state by a source of radio frequency (RF) radiation, such as a magnetron 29 located in the irradiator 13. The atoms of the excited gas in the light source 21 emit UV light rays 39 (similar to UV light rays 38) radiating from the light source 21 in all directions and most of the UV light 39 is reflected toward the central axis of the work piece tube 30. The light source 21 and reflector design may be optimized to produce the maximum peak light intensity (lamp irradiance) at a surface of a work product (also propagating linearly out of the page) placed inside the work piece tube 30. In one example, in operation, the UV light rays 39 may be sensed and measured by the photocell 2 in the device 1 in the irradiator 13, which transduces the UV light rays 39 into a current or a voltage. Similarly, in operation, the UV light rays 39 are also sensed and measured by the photocell 2 in the device 1 in the irradiator 12, which transduces the UV light rays 39 into a current or a voltage. In one example, the current or voltage received from the device 1 in the irradiator 12 and the device 1 in the irradiator 13 may be monitored and compared with a first predetermined baseline output current or voltage. In another example, the current received from the device 1 in the irradiator 13 may be monitored and compared with a second predetermined baseline output current or voltage. In one example, the first pre-determined baseline output current or voltage is the same as the second predetermined baseline output current or voltage. In another example, the second pre-determined baseline output current or voltage is different from the first predetermined baseline output current or voltage. If the light sources 20 and 21 are of different types, such as different plasma types because the bulb fills are different, then the baseline pre-determined outputs may be different. Depending on the proximity of irradiator 12 to irradiator 13, and on how closely they are face-to-face, it may be necessary to establish different operating sensing levels of the photocell 2 in each photodetector device 1. This would be done to compensate for the amount of light that photocell 2 in irradiator 12 detected that emanated from irradiator 13 and vise versa. This compensation would be done so that the photodetector may continue to detect that the light output from source 20 in either of the irradiator 12 or 13 that may have decreased or failed. As noted, one of the difficulties of having two irradiators facing each other is that the light output from one irradiator may satisfy the photocell placed in the other irradiator and vice versa. Thus, it may be very difficult to accurately determine if both of the irradiators are functioning correctly. Therefore, for example, if one of the irradiators becomes damaged such that the light source does not function, the system may not be able to detect that there is a problem because the photocells in each of the two irradiators may continue to sense the UV rays from the other irradiator. Accordingly, the system may not be able to detect that the light source in one of the irradiators has malfunctioned. However, in the example described with respect to the device 1 in FIG. 1 and the FIGS. 6A-8, the system may not be able to detect that the light source in one of the irradiators has malfunctioned. The system may be able to tune the device 1 in each of the irradiators 12 and 13 such that the current or voltage output from each of the device 1 from each of the irradiators 12 and 13 meets the first predetermined baseline output current or voltage and the second predetermined baseline output current or voltage.

Referring to FIGS. 6A-8, if for example, the light source 20 in the irradiator 12 stops functioning, the value of the current or voltage received from the photocell 2 of the device 1 in the irradiator 12 will be less than the value of the first predetermined baseline output current or voltage. Accordingly, the position of the member 8 within the receptacle 6 may be adjusted to tune the device 1 in the irradiator 12 to the light source 21. As noted above, a signal is sent to motor (not shown) to adjust the member 8 within the receptacle. Specifically, the member 8 is rotated, preferably by the motor, to move in or out of the receptacle 6 until the mating surface 9 of the member 8 is aligned to a specific amount/degree with the opening 5 in the metallic block 4. In addition, as noted, the specific degree of alignment may be determined when the measured light current or voltage is substantially the same as the first predetermined baseline output current or voltage. Further, as noted above, when this specific degree of alignment is achieved, the motor stops, which in turn stops any further rotation of the member 8 and the gear then affixes the member 8 in this alignment position within the receptacle 6.

Similarly, the value of the current or voltage received from the photocell 2 of the device 1 in the irradiator 13 may be less than the value of the second predetermined baseline output current or voltage when the light source 20 in the irradiator 12 stops functioning. Accordingly, the position of the member 8 within the receptacle 6 may be adjusted to tune the device 1 in the irradiator 13 to the light source 21. As noted above, a signal is transmitted to the motor (not shown) to adjust the member 8 within the receptacle. Specifically, the member 8 may be rotated, preferably by the motor, to move in or out of the receptacle 6 until the mating surface 9 of the member 8 is aligned to a specific level/degree with the opening 5 in the metallic block 4. In addition, as noted, the specific degree of alignment may be determined when the measured light current or voltage is substantially the same as the second predetermined baseline output current or voltage. Further, as noted above, when this specific degree of alignment is achieved, the motor stops, which in turn stops any further rotation of the member 8 and the gear then affixes the member 8 in this alignment position within the receptacle 6.

Figure 9A:
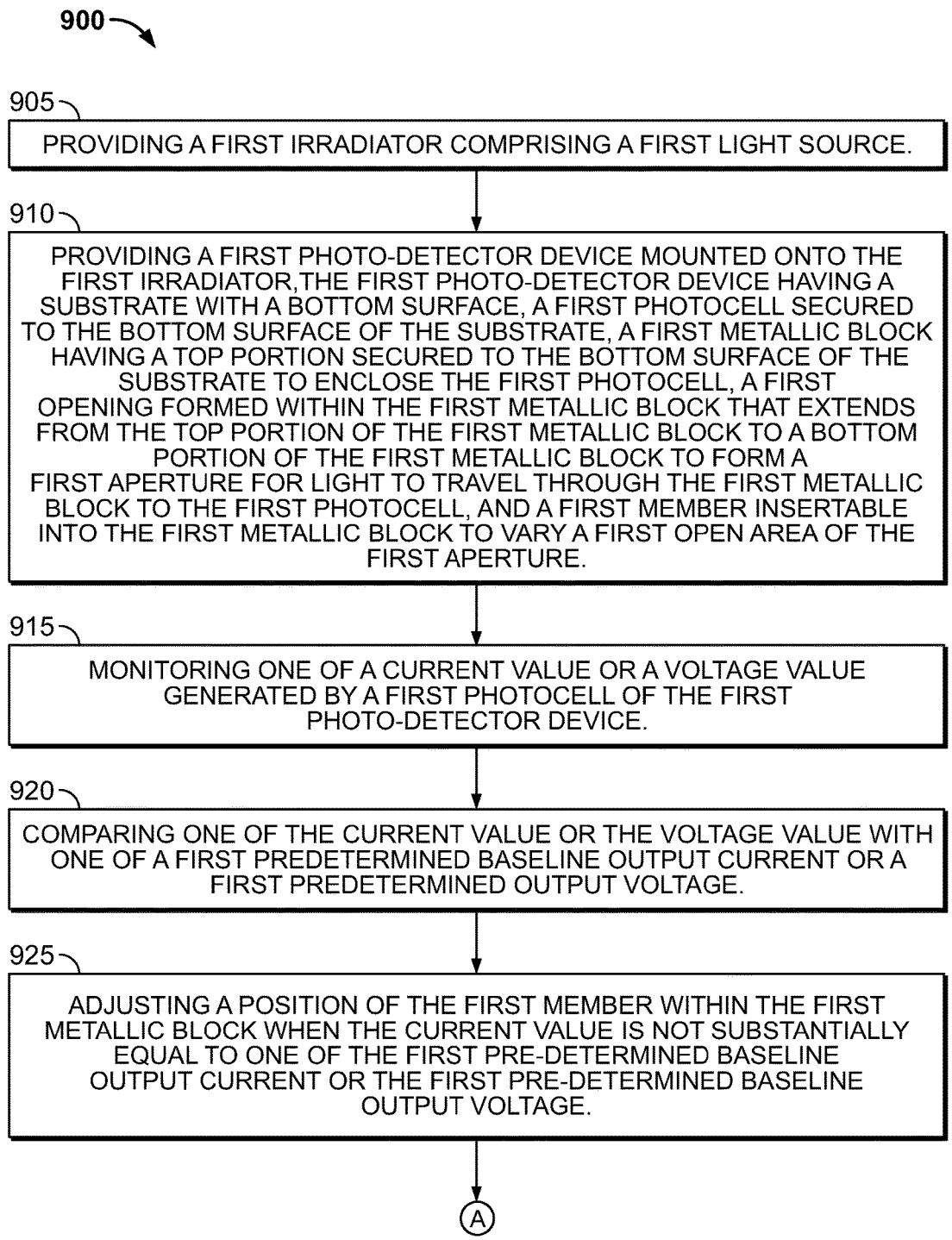
FIGS. 9A and 9B are a process flow diagram illustrating how to calibrate a lamp assembly with one or more irradiators.
Figure 9B:
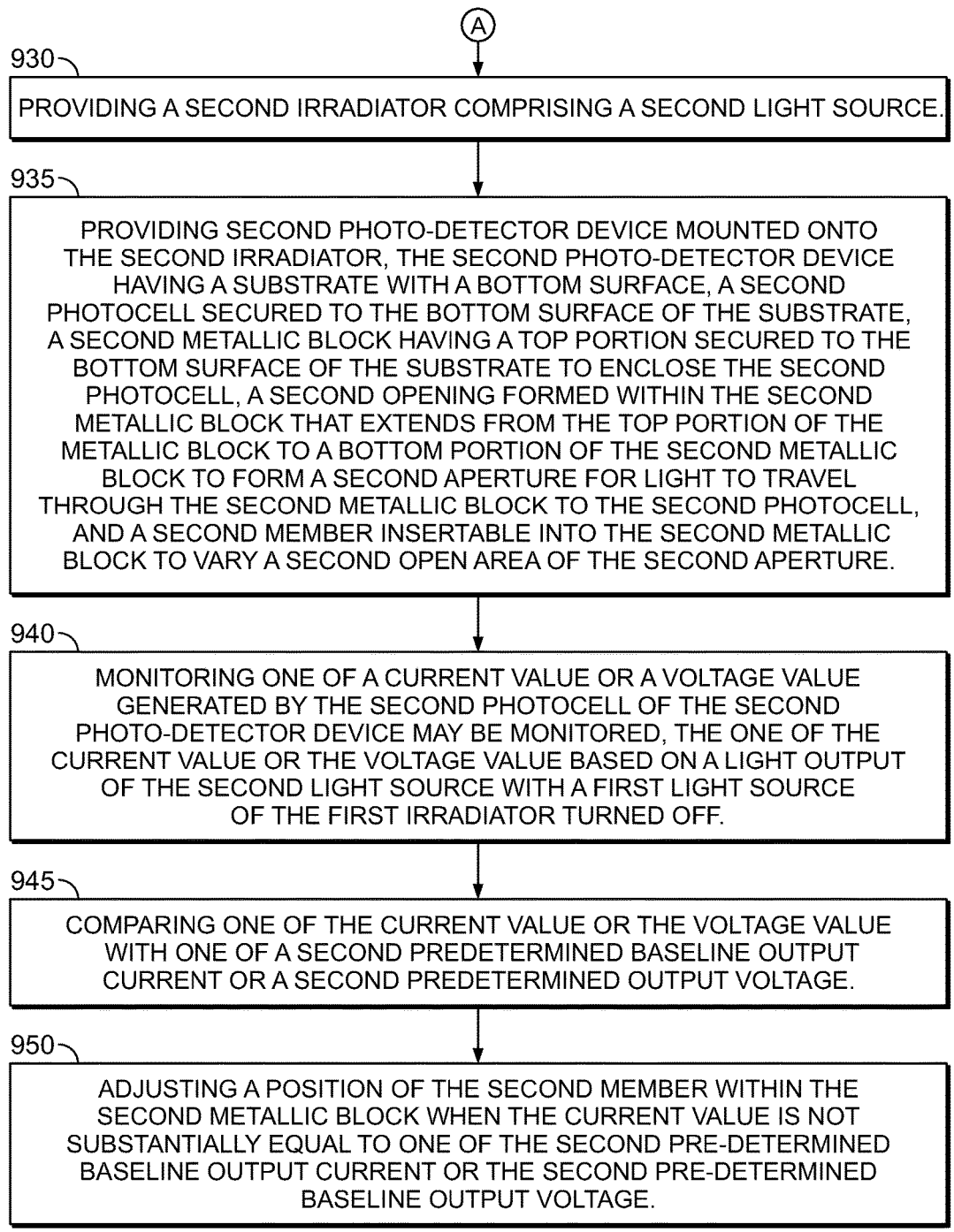

FIGS. 9A and 9B are a process flow diagram 900 illustrating how to calibrate a lamp assembly with one or more irradiators. In an example, at block 905, a first irradiator comprising a first light source may be provided. At block 910, a first photo-detector device mounted onto the first irradiator may be provided. The first photo-detector device may include a substrate having a bottom surface. The first photo-detector device may further include a first photocell secured to the bottom surface of the substrate. The first photo-detector device may further include a first metallic block having a top portion secured to a bottom surface of the substrate to enclose the photocell. A first opening may be formed within the first metallic block that extends from the top portion of the first metallic block to a bottom portion of the first metallic block to form a first aperture for light to travel through the first metallic block to the first photocell. The first photo-detector device may further include a first member insertable into the first metallic block to vary a first open area of the first aperture.

In an example, at block 915, a current value or a voltage value generated by the first photocell of the first photo-detector device may be monitored. The current value or the voltage value may be based on a light output of the first light source. At block 920, the current value or the voltage value may be compared with one of a first predetermined baseline output current or a first predetermined output voltage. At block 925, a position of the first member within the first metallic block may be adjusted when the current value is not substantially equal to one of the first pre-determined baseline output current or the first pre-determined baseline output voltage. The first member may be rotated to move in or out of a receptacle formed within the first metallic block until the first aperture of the first member is aligned to a specific degree with the first opening of the first metallic block. The specific degree of alignment may be determined when one of the current values is substantially equal to one of the first predetermined baseline output current or the first predetermined baseline output voltage.

In an example, at block 930, a second irradiator comprising a second light source may be provided. At block 935, a second photo-detector device mounted onto the second irradiator may be provided. The second photo-detector device may include a substrate having a bottom surface. The second photo-detector device may further include a second photocell secured to the bottom surface of the substrate. The second photo-detector device may further include a second metallic block having a top portion secured to the bottom surface of the substrate to enclose the second photocell. A second opening may be formed within the second metallic block that extends from the top portion of the second metallic block to a bottom portion of the second metallic block to form a second aperture for light to travel through the second metallic block to the photocell. The second photo-detector device may further include second member insertable into the second metallic block to vary a second open area of the second aperture. The second irradiator may be positioned to at least partially face a first irradiator such that light emanating from the first irradiator is at least partially received by the second photo-detector through the second open area of the second aperture.

In an example, at block 940, a current value or a voltage value generated by the second photocell of the second photo-detector device may be monitored. The current value or the voltage value may be based on a light output of the second light source with a first light source of the first irradiator turned off. At block 945, the current value or the voltage value may be compared with a second predetermined baseline output current or a second predetermined output voltage. At block 950, a position of the second member within the second metallic block may be adjusted when the current value is not substantially equal to one of the second pre-determined baseline output current or the second pre-determined baseline output voltage.

The second member may be rotated to move one of in and out of a receptacle formed within the second metallic block until the second aperture of the second member is aligned to a specific degree with the second opening of the second metallic block. The specific degree of alignment may be determined when one of the current value is substantially equal to one of the second predetermined baseline output current or the second predetermined baseline output voltage.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A photo-detector device comprising:
a substrate having a bottom surface;
a photocell secured to the bottom surface of the substrate;
a metallic block having a top portion secured to the bottom surface of the substrate to enclose the photocell;
an opening formed within the metallic block that extends from the top portion of the metallic block to a bottom portion of the metallic block to form an aperture for light to travel through the metallic block to the photocell; and
a member insertable into the metallic block to vary an open area of the aperture, a position of the member within the metallic block being adjusted by a motor, the motor being controlled by a microprocessor in a feedback loop process at least partially based on an electrical signal received by the microprocessor, the electrical signal being related to an amount of light detected by the photocell.

2. The photo-detector device of claim 1, wherein a receptacle is formed within the metallic block.

3. The photo-detector device of claim 2, wherein the receptacle intersects the opening within the metallic block.

4. The photo-detector device of claim 2, wherein the member is insertable into the metallic block via the receptacle.

5. The photo-detector device of claim 2, wherein the member is rotatable within the receptacle to vary the open area of the aperture.

6. The photo-detector device of claim 1, wherein rotation of the member causes the aperture to substantially align with the opening of the metallic block.

7. The photo-detector device of claim 1, wherein rotation of the member causes the aperture to partially align with the opening of the metallic block.

8. The photo-detector device of claim 1, wherein the member has a shape conforming to a shape of the receptacle.

9. The photo-detector device of claim 1, further comprising a lens coupled between the bottom surface of the substrate and the top portion of the metallic block.

10. An intelligent ultraviolet curing apparatus, comprising:
an irradiator including an ultraviolet light source for curing; and
a photo-detector device mounted on the irradiator, the photo-detector device having a substrate with a bottom surface, a photocell secured to the bottom surface of the substrate, a metallic block having a top portion secured to the bottom surface of the substrate, an opening formed within the metallic block that extends from the top portion of the metallic block to a bottom portion of the metallic block to form an aperture for light to travel through the metallic block to the photodetector, and a member insertable into the metallic block to vary an open area of the aperture, a position of the member within the metallic block being adjusted by a motor, the motor being controlled by a microprocessor at least partially based on an amount of light detected by the photocell.

11. The apparatus of claim 10, wherein the photo-detector device protrudes from the irradiator such that the bottom portion of the metallic block is insertable into a slit formed on the irradiator.

12. The apparatus of claim 10, wherein the bottom portion of the metallic block faces a reflector cavity inside of the irradiator.

13. The apparatus of claim 10, wherein the photo-detector device comprises a receptacle formed within the metallic block, the receptacle intersects the opening within the metallic block, and the member is inserted into the metallic block via the receptacle.

14. The apparatus of claim 10, wherein a position of the member is adjusted within the receptacle when one of a current value or a voltage value, corresponding to a light output from the light source, is not substantially equal to one of a pre-determined baseline output current or a pre-determined baseline output voltage, respectively.

15. The apparatus of claim 10, wherein the member is rotated to move one of in and out of the receptacle until the aperture of the member is aligned to a specific degree with the opening of the metallic block.

16. The apparatus of claim 15, wherein the specific degree of alignment is determined when one of a current value or a voltage value, corresponding to a light output from the light source, is substantially equal to one of the predetermined baseline output current or the predetermined baseline output voltage.

* * * * *